March 5, 1957 — J. L. CAHILL, JR — 2,783,604
GRASS CATCHER

Filed Dec. 5, 1955 — 2 Sheets-Sheet 1

John L. Cahill, Jr.
INVENTOR.

BY *Clarence A. O'Brien*
*and Harvey B. Jackson*
Attorneys

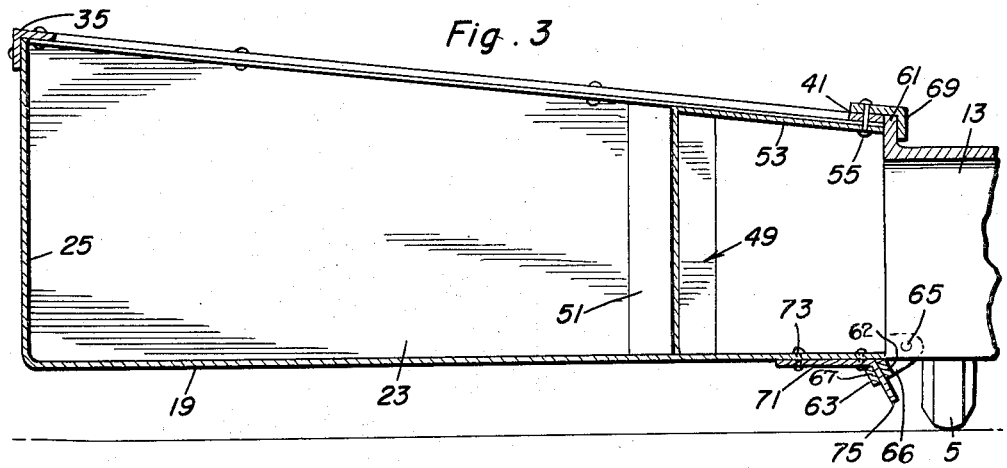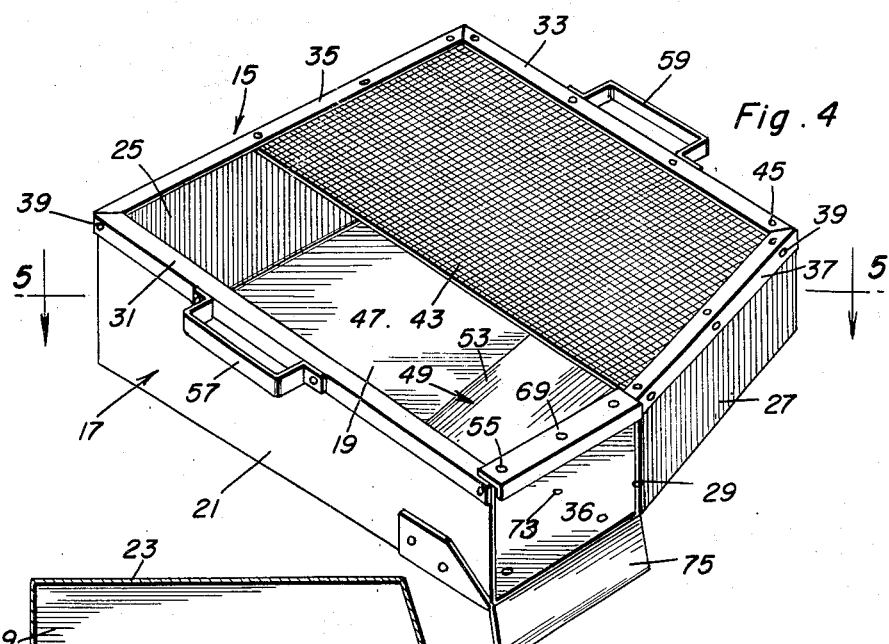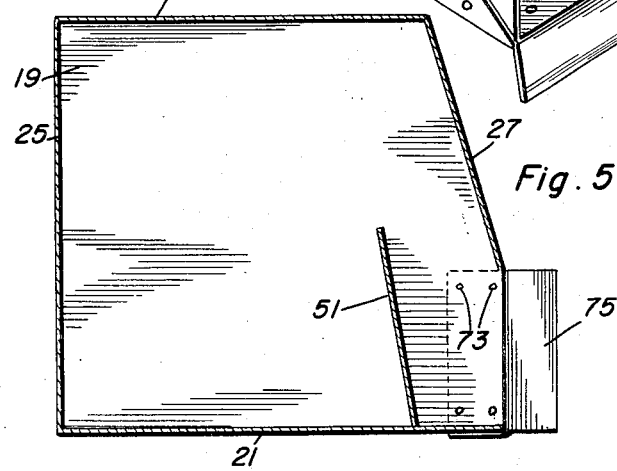

2,783,604
Patented Mar. 5, 1957

2,783,604

GRASS CATCHER

John L. Cahill, Jr., Oklahoma City, Okla.

Application December 5, 1955, Serial No. 550,881

4 Claims. (Cl. 56—202)

My invention relates to improvements in grass catchers for rotary blade lawn mowers of the general type having a side grass discharge throat in the blade housing.

The primary object of my invention is to provide a simply constructed, highly efficient grass catcher for such mowers, together with means for quickly and easily attaching the catcher to or detaching it from said throat.

Another object is to provide in conjunction with the above, a grass catcher having an opening through which the catcher may be emptied, and baffle means in the catcher for deflecting the grass away from the opening.

Other and ancillary objects, together with the precise nature of my improvements will become readily apparent when the following description and claims are read with reference to the drawings accompanying and forming part of this specification and in which:

Figure 3 is an enlarged view in vertical section taken on the line 3—3 of Figure 1;

Figure 1:
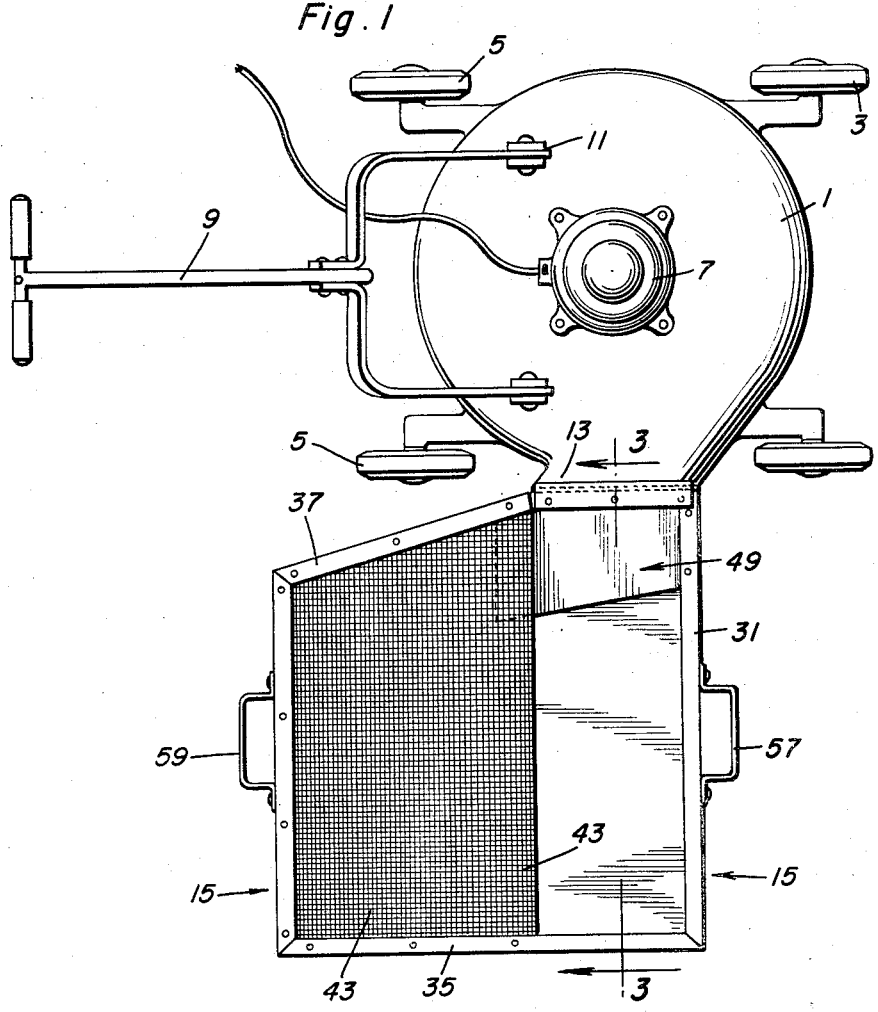
Figure 1 is a view in plan of my improved grass catcher attached to the throat of the lawn mower.
Figure 2:
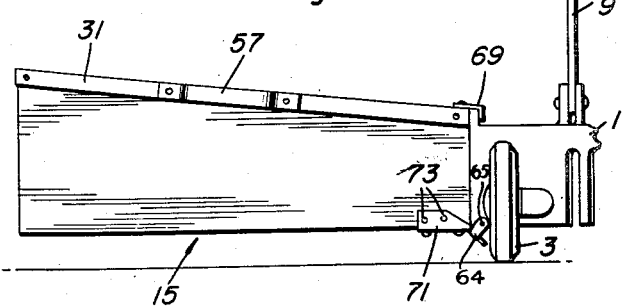
Figure 2 is a fragmentary view in front elevation of the same.

Figure 4 in an enlarged view in perspective of the grass catcher detached; and,

Figure 5 is a view in horizontal section taken on the line 5—5 of Figure 4 and drawn to a smaller scale.

Referring to the drawings by numerals, the type of lawn mower for which my improved grass catcher is especially designed comprises a generally circular cutter blade housing 1 mounted on pairs of front and rear wheels 3, 5, respectively, a motor 7 on top of the housing 1 for driving the cutter blade, not shown, a pusher handle 9 connected, as at 11, to the housing 1, and a rearwardly inclined side discharge throat 13 generally rectangular in form.

My improved grass catcher, designated generally by the numeral 15, comprises a sheet metal pan 17, generally rectangular and having a flat bottom 19, front and rear walls 21, 23, respectively, an outer side wall 25, and an inner side wall 27. The pan 17 gradually increases in depth from the inner side wall 27 to the outer side wall 25 to facilitate scattering of the grass caught in the pan.

The inner side wall 27 is spaced from the front wall 21 and forms therewith a rectangular corner grass intake opening 29 in the inner side of the pan 17 at a front corner of the pan and which is of approximately the same size as the throat 13 and from which said inner wall 27 inclines inwardly and rearwardly of the pan 17 for a purpose presently explained.

Angle bars 31, 33, 35, 37 riveted in place, as at 39, reinforce the upper edges of the front, rear, and outer and inner walls 21, 23, 25, 27, respectively, and a flat extension 41 of the angle bar 37 bridges the top of the intake opening 29.

A screen panel 43 covers the top of the pan 17 from the intake opening 29 to the rear wall 23 and is preferably riveted, as at 45, to the angle bars 33, 35, 37, said screen panel 43 being spaced rearwardly of the front wall 21 to provide a front opening 47 in the top of the pan 17 through which the pan may be emptied of grass.

The baffle means comprises a baffle plate 49 of right angled cross-section extending in the pan 17 from the front wall 21 under the screen panel 43 in spaced relation to the rear wall 23. The baffle plate 49 comprises a vertical side wall 51 spaced from the opening 29 and inclined parallel with the inner wall 27, and a substantially horizontal top wall 53 at the top of the opening 29 bridging the opening 47 and riveted as at 55 to the extension 41.

Suitable front and rear handles 57, 59 are provided on the angle bars 31, 33.

The means for detachably attaching the pan 17 to the throat 13 comprises a flange member 61 on the front top edge of the throat 13, a pair of laterally spaced bars 62, 63 connected at their ends by ears 64, 66 riveted, as at 65, to said throat 13 to extend along its bottom and in front thereof, said bars 62, 63 forming a longitudinal slot 67 therein, an angle bar 69 fixed on the extension 41 above the opening 29 by the rivets 55 and adapted to hook over the flange member 61, and a keeper plate 71 of resilient metal riveted, as at 73, to the bottom 19 of the pan 17 with a flexible lip 75 extending outwardly and downwardly at the opening 29 and adapted to be inserted downwardly in the slot 67. The lip 75 forms a deflector at the bottom of the throat 13 and opening 29 for deflecting cut grass into said opening 29 and from the bottom of said throat. As will readily be seen, the pan 17 is attached to the throat 13 to travel over the ground clear thereof when the lawn mower is being pushed.

The operation of the grass catcher will be readily understood. As the cut grass passes out of the throat 13 under the usual pressure, it enters the inlet opening 29 and impinges against the baffle plate 49 to be deflected by the vertical side walls 51 and the inside wall 27 into the rear of the pan and under the screen panel 43. Thus, the cut grass is directed away from said opening 47 as well as from the opening 29. Cut grass in the lower part of the throat 13 is deflected upwardly into the opening 29 by the lip 75. By lifting the pan 17 the angle bar 69 may be unhooked from the flange member 61 and the lip 75 may be lifted out of the slot 67 so that the pan 17 can be detached from the throat 13 for emptying through the opening 47, either by hand, or by tilting the pan upwardly and forwardly on the ground.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. The combination with a side grass discharge open bottom throat of a cutter blade housing a lawn mower, of a grass catcher pan having a front wall, a bottom, and a side wall provided with a grass inlet opening adjacent the front wall, co-engaging means on said throat and pan at the top and bottom of said throat detachably attaching said pan to said throat in horizontal position with said throat opposite said inlet opening to discharge cut grass into said pan through said inlet opening, and baffle means in said pan opposite said inlet opening and rising from the bottom of the pan for deflecting grass rearwardly in said pan.

2. The combination of claim 1, the co-engaging means at the bottom of said throat comprising a deflector plate on the bottom of said pan inclining downwardly and outwardly at said inlet opening below the bottom of said throat for deflecting grass from said throat upwardly into said inlet opening.

3. The combination of claim 1, said baffle means comprising a right angled plate including a vertical wall rising from the bottom of said pan and spaced inwardly of and opposite said inlet opening parallel with said side wall and a horizontal wall at the top of said inlet opening.

4. The combination of claim 3, said side wall and vertical wall inclining rearwardly and inwardly of the pan from said inlet opening to facilitate deflecting grass rearwardly in the pan.

References Cited in the file of this patent

UNITED STATES PATENTS

| | | |
|---|---|---|
| 2,071,872 | Cockburn | Feb. 23, 1937 |
| 2,641,100 | Sylvester | June 9, 1953 |
| 2,708,334 | Coners | May 17, 1955 |
| 2,719,396 | Morris et al. | Oct. 4, 1955 |
| 2,720,742 | Hilton | Oct. 18, 1955 |